United States Patent

Börger et al.

[11] Patent Number: 5,875,706
[45] Date of Patent: Mar. 2, 1999

[54] FOOD PROCESSING APPARATUS

[75] Inventors: Georg Börger, Steinbach; Karl-Heinz Kamprath, Wiesbaden; Simone Hackel-Ripsam, Limburgerhof, all of Germany

[73] Assignee: Braun Aktiengesellschaft, Frankfurt, Germany

[21] Appl. No.: 935,436

[22] Filed: Sep. 23, 1997

[30]  Foreign Application Priority Data

Sep. 26, 1996 [DE] Germany ............... 196 39 582.8

[51] Int. Cl.$^6$ ............... A23N 1/02; A47J 43/046; A47J 43/06; A47J 43/07
[52] U.S. Cl. ............... 99/492; 99/510; 241/37.5; 241/92; 241/282.1; 241/101.01; 366/291; 366/314; 366/601
[58] Field of Search ............... 99/492, 509–513; 366/291, 297–300, 314, 601; 241/37.5, 92, 282.1, 282.2, 101.01, 101.2

[56]  References Cited

U.S. PATENT DOCUMENTS

| | | | |
|---|---|---|---|
| 3,722,831 | 3/1973 | Bialas et al. ............... | 366/291 |
| 3,895,781 | 7/1975 | Lodige et al. ............... | 366/291 X |
| 4,189,241 | 2/1980 | Baldacci ............... | 366/297 |
| 4,542,857 | 9/1985 | Akasaka ............... | 241/92 |
| 4,691,870 | 9/1987 | Fukunaga et al. ............... | 241/37.5 X |
| 4,747,695 | 5/1988 | Schmidt ............... | 366/291 |
| 4,799,626 | 1/1989 | Hickel et al. ............... | 241/282.1 X |
| 4,911,557 | 3/1990 | Dormer et al. ............... | 366/314 X |
| 5,071,077 | 12/1991 | Arroubi et al. ............... | 241/282.2 X |
| 5,435,237 | 7/1995 | Huang ............... | 99/492 |
| 5,524,530 | 6/1996 | Nijzingh et al. ............... | 99/492 |

FOREIGN PATENT DOCUMENTS

| | | |
|---|---|---|
| 31 26 956 A1 | 3/1982 | Germany . |
| 24 11 90 | 12/1986 | Germany . |
| 42 20 234 A1 | 12/1993 | Germany . |

Primary Examiner—Timothy F. Simone
Attorney, Agent, or Firm—Fish & Richardson P.C.

[57]  ABSTRACT

A food processing apparatus with a base unit (1) which has at least two separate mounts (2, 3), each for one processing bowl (4, 6), with one drive member (7, 8) positioned in the area of each of the mounts (2, 3) and being in driving connection with an electric motor, is equipped with a safety device. This safety device serves the purpose of ensuring that only one processing bowl (4) at a time can be mounted on the appliance in an operating position, while the safety device inhibits a second processing bowl (6) from being accommodated in the other mount (3). To accomplish this, a safety element (11) is provided which is adjustable between two blocking positions. When the safety element (11) is in the one position, the first mount (2) is rendered unable to accommodate a processing bowl while the second mount (3) is enabled to accommodate a processing bowl. In the other position, the second mount (3) is rendered unable to receive a processing bowl while the first mount (2) is enabled to receive a processing bowl. The safety element (11) is moved into its respective blocking position by the processing bowl (4, 6) itself when this particular bowl (4, 6) is inserted in its assigned mount (2, 3).

14 Claims, 4 Drawing Sheets

FOOD PROCESSING APPARATUS

This invention relates to a food processing apparatus with a base unit which has at least two separate mounts, each for one processing bowl, with one drive member being positioned in the area of each of the mounts and being in driving connection with an electric motor, and with a bowl locking device assigned to each of the mounts.

BACKGROUND OF THE INVENTION

Food processors are used for various jobs in the kitchen. Examples include, inter alia, kneading, stirring and beating, to which end large mixing bowls are customarily used in which an appropriate tool, such as a kneading tool, a whisk-like agitating or beating tool, rotates. A further area of application for food processors of this type is slicing, shredding, grating and mixing with appropriate tools for performing such comminuting and mixing functions. For this area of application the food processor is equipped with a bowl unit of smaller capacity than a mixing bowl. Finally, a third area of application for such food processors is blending, but also chopping and comminuting, to which end an appropriately adapted container is mounted on the food processor.

Conventionally, the individual processing bowls are seated on a drive coupling or drive spindle which projects from the base unit and is centrally located with reference to a dished receptacle for accommodating the bowl. This drive spindle then engages in a mating hub member on the bottom of the bowl, which hub member extends into the interior of the bowl and drives the respective tool inside the bowl.

To be able to put food processors to more flexible use, such food processors are now equipped preferably with two bowl mounts, each of which is assigned a separate drive spindle. A matching processing bowl is then placed on its associated drive spindle. The two drive spindles can be driven at different rotational speeds by a single motor mounted in the base unit on account of different transmission ratios between the drive shaft of the motor and the particular drive spindle.

For safety reasons the processing bowls of such food processors are locked in their intended position in the base unit in order to create a secure driving connection between the processing bowl and the base unit and to ensure that the processing bowl remains firmly connected with the base unit during operation and particularly when a certain imbalance arises in the bowl due to uneven distribution of the food being processed.

On appliances of this type which possess several mounts for several processing bowls it should not be possible, for safety reasons, to fit several processing bowls simultaneously to the appliance in such a way that a driving connection is established between several processing bowls and the appliance.

Proceeding from the above described food processors, which have at least two separate mounts for one processing bowl each, it is an object of the present invention to equip such a food processor with a safety device which rules out the possibility of a simultaneous driving connection arising between several processing bowls on several drive spindles, such a safety device being desirably of simple and fail-proof design.

SUMMARY OF THE INVENTION

On the basis of the state of the art initially referred to, this object is accomplished by providing a safety device with at least one safety element, said safety element being adjustable between at least two positions in such a way that in the one position the first mount is rendered unable to accommodate a processing bowl in operating position while the second mount is enabled to accommodate a processing bowl in operating position, and that in the other position the second mount is rendered unable to accommodate a processing bowl in operating position while the first mount is enabled to accommodate a processing bowl in operating position, and said safety element being moved into its respective blocking position by the processing bowl itself when this particular bowl is inserted in its mount.

The safety element is a simple, mechanical part which performs a locking function by blocking the currently unused mount when a processing bowl is inserted in operating position in the other mount. Hence this safety element is moved by the process of inserting the respective processing bowl in one of the mounts, such that the other mount is rendered unable to accommodate an inserted processing bowl, with the result that it is only ever possible for a single processing bowl to be placed on its work spindle on the appliance in driving connection therewith. If an attempt is made to place a processing bowl on a mount when another processing bowl is already positioned in another mount, the safety element cannot be moved, its movement being inhibited by the processing bowl already positioned on the appliance. In consequence, this safety device is always actuated, without any additional intervention by the user of such a food processor, namely unconsciously, whenever a processing bowl is placed on the food processor. As a safety device it is usually sufficient to use a single safety element which is displaceably arranged between the respective positions, resulting in a construction that is not only extremely simple but also reliable functionally and operationally. The displaceability or adjustability of the safety element between the respective blocking positions and enabling positions may be simple, but the result is a high level of safety and a reliable mode of operation even when attempts are made to use the appliance incorrectly.

It will be understood that such a safety element as that previously described is suitable for use not only in food processors having two processing bowls but also in such appliances as have three processing bowls, for example. In this case the one safety element, comprising two or more parts as required, is suitably shaped and displaceably arranged in such a way that when a processing bowl is inserted in one of the processing bowl mounts such as to establish a driving connection with the drive motor of the appliance, the two other mounts for the respective processing bowls are blocked by the safety element. In this blocking position of the safety elements it is impossible for the other bowls to be inserted in such a way as to establish a driving connection to a drive spindle.

There are various ways to arrange the safety element in its blocking position so as to prevent a driving connection being established between another processing bowl and a drive spindle. A simple possibility exists when the safety element projects into the area of the mount into which the processing bowl is inserted in the base unit of the food processor. This part of the safety element projecting into the area in which the processing bowl is normally inserted to adopt its operating position makes it impossible for the processing bowl to be positioned properly and for a driving connection to be established between the hub member of the processing bowl and the drive spindle.

To make it impossible for the processing bowl to be placed with its hub member onto the drive spindle, the safety element is preferably positioned in its blocking position underneath the bottom of the processing bowl when an attempt is made to place the processing bowl down onto the drive spindle, thus preventing the processing bowl from being lowered with its hub member onto the drive spindle.

A further preferred arrangement of the safety element makes it impossible for a processing bowl to be seated in place with the safety element in the blocking position. In this arrangement, the safety element in its blocking position extends into holding and/or locking members on the processing bowl and on the mount on the appliance, which members are normally in relative engagement when the processing bowl is locked in its mount. The safety element extending into these holding and/or locking members makes it impossible for these members to engage with each other.

As previously mentioned, it is preferable for the safety element to be moved into its blocking position when a processing bowl is inserted in its mount. No special actions are then required of the user to adjust the safety element other than those which he performs in any case when placing the processing bowl on its corresponding mount.

A simple arrangement of the safety element results when the safety element is linearly adjustable between the various positions, that is, between the respective blocking and enabling positions. For this purpose the safety element may be slidably mounted on a bar so that when the safety element is moved along the bar into its respective limit positions it blocks the one or the other mount with regard to the possibility of a processing bowl being inserted. Furthermore, by positioning and guiding the safety element on a bar the arrangement can be constructed with great stability using simple means.

A further possibility of straightforward design for a safety element arrangement results when the safety element is adapted to rotate about an axis rather than perform a linear movement. In this case the safety element may have an oval or some other shape so that when it is rotated it projects with its edge zones into the relevant areas on the mount or the holding and/or locking members in the mount. Such a safety element has the form of a cam disk with respective projections which are contacted by a processing bowl properly inserted in a mount in order to displace the safety element.

To move the safety element into the respective blocking position it may be suitable to provide a cam face on the processing bowl. This cam face, of wedge shape for example, engages behind the safety element when a processing bowl is inserted in its mount, displacing the safety element when such a processing bowl is locked in its mount on the holding and/or locking members using a slight turning motion. If a processing bowl is already in operating position in the other mount, then the safety element cannot be pushed further, meaning that the safety element is already in a blocking position which cannot be changed on account of the processing bowl inserted in the other mount. It is then impossible to position or lock the processing bowl in its mount by further turning. Such a cam face is preferably arranged on the outer circumference of the bottom part of the processing bowl.

Such a safety element may also be arranged on the upper side of the base unit where it can be seen by the user. It is thus easy for the user to recognize the function of the safety element so that he will desist from trying to fasten a processing bowl forcibly in its mount if the safety element is in its blocking position for one bowl because a processing bowl is already positioned in the other mount.

The length of displacement of the safety element may be limited by stops to ensure that the safety element can only be moved between the relevant blocking positions.

Further details and features of the present invention will become apparent from the subsequent description of embodiments illustrated in the accompanying drawings. In the drawings,

DESCRIPTION OF PARTICULAR EMBODIMENT

Figure 1:
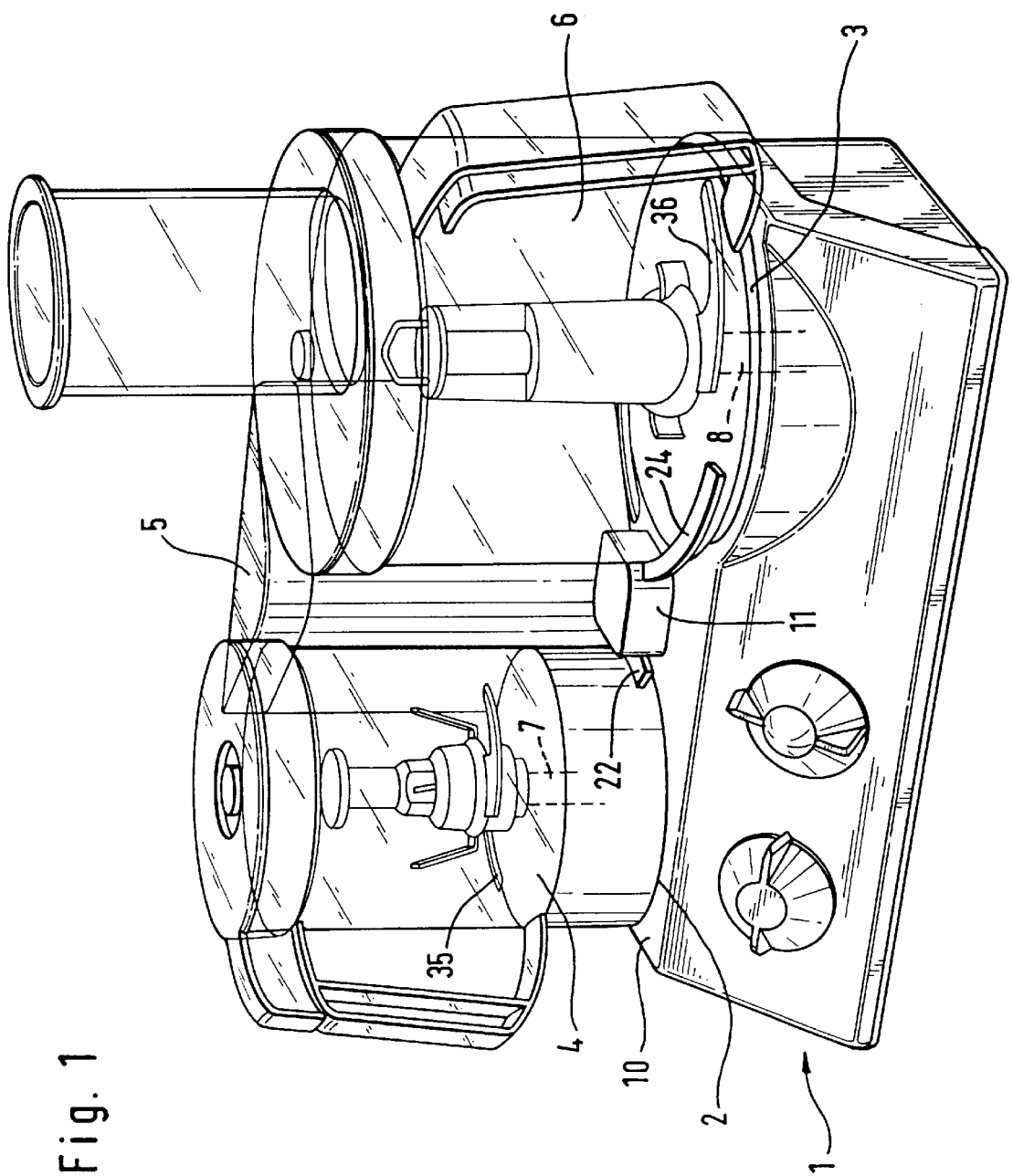
FIG. 1 is a perspective front view of a food processing apparatus with a processing bowl properly installed and locked in place and with a further processing bowl rendered unable to occupy an operating position by a safety element.
Figure 2:
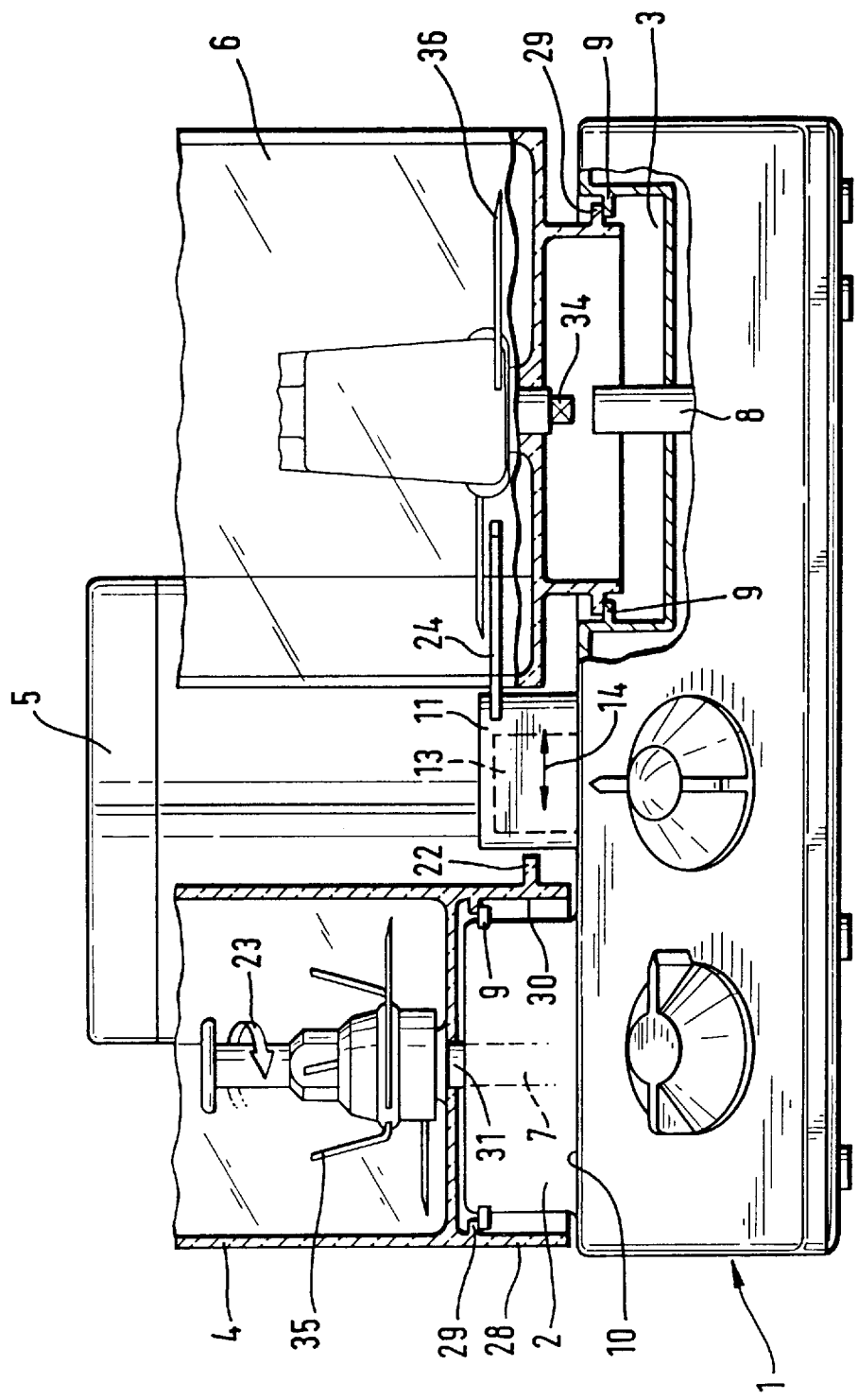
FIG. 2 is a schematic front view of the apparatus of FIG. 1 showing the processing bowls partly sectioned.
Figure 3:
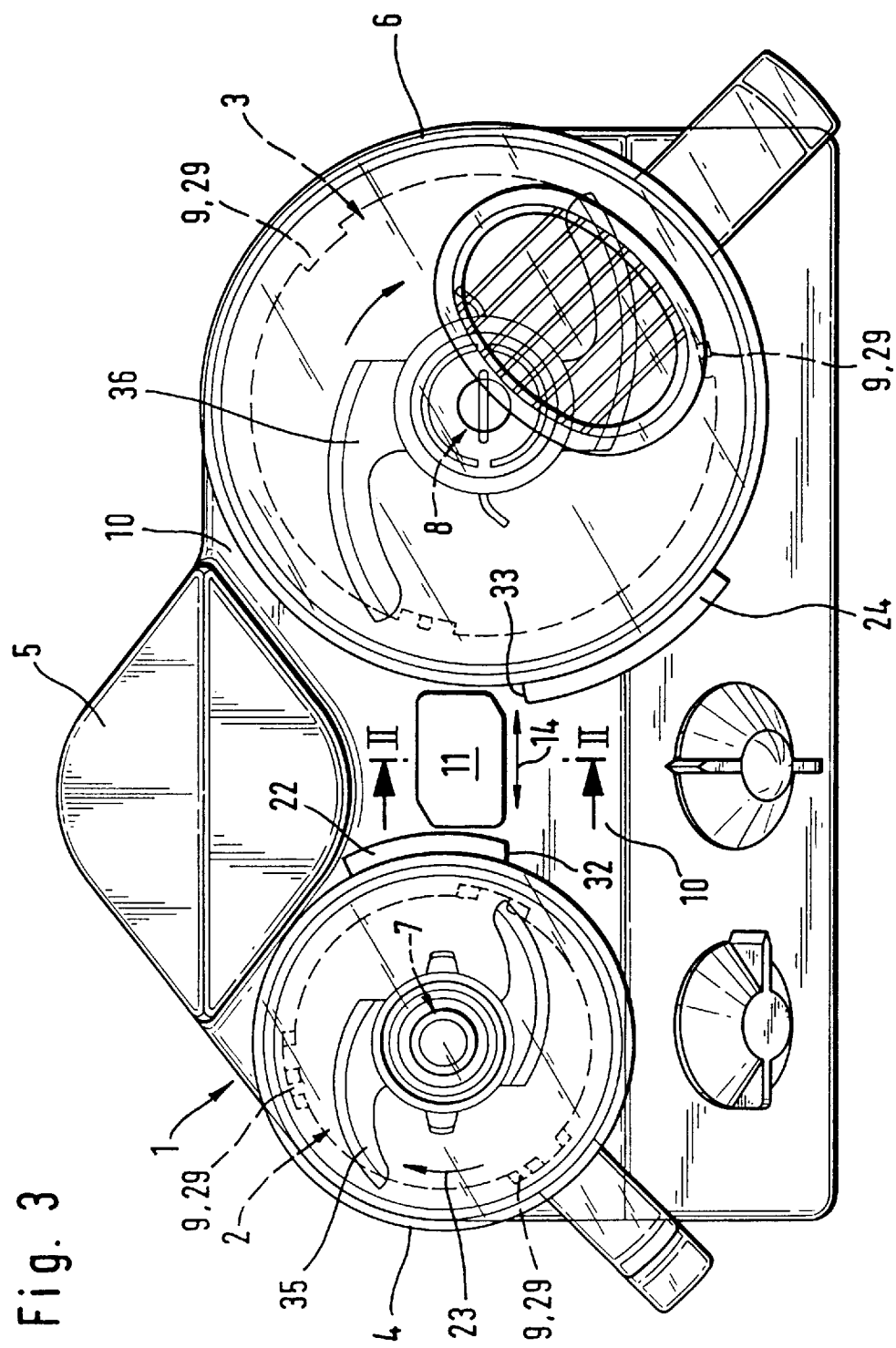
FIG. 3 is a top plan view of the apparatus of FIG. 1.

The food processing apparatus as shown in FIGS. 2 and 3 includes a base unit 1 with two mounts 2, 3, each for one processing bowl 4, 6. A rotary tool 35, 36 is located in each bowl. The left-hand processing bowl 4 with the smaller diameter is used preferably for the blending of liquids while the right-hand processing bowl 6 with the larger diameter is used preferably for kneading dough, for chopping, mixing, etc. food materials. In the rear area of the housing in FIG. 1, roughly between the two mounts 2, 3, a tower-like housing portion 5 extends up from the base unit and contains an electric motor, not shown in greater detail, whose output shaft, not shown, is connected to a drive belt pulley, not shown, which is connected, through belts, in a rotating relationship to pulleys, equally not shown, which are fastened to the drive spindles 7, 8 (see FIGS. 2 and 3). When the motor rotates, the two drive spindles 7, 8 associated with the respective mounts 2 and 3 for the processing bowls 4 and 6 are thus turned at different rotational speeds. The motor output shaft, the drive belt pulley, the two pulleys and the belt form the food processor's gearing which is arranged underneath the processing bowls in the base unit 1.

To process food, each of the processing bowls 4, 6 is placed on its assigned mount 2 or 3 and slightly turned so that corresponding holding and/or locking members 9, 29 on the mounts 2, 3 and on the processing bowls 4, 6, as shown in FIGS. 1 and 2, are in locking engagement.

According to FIGS. 1, 2, 3, and 4, a safety element 11 which is mounted on a bar 12 of a carrier 13 forming part of the base unit 1 so as to be slidable in the direction of the double arrow 14 (FIGS. 2, 3, and 4), is positioned on the upper side 10 of the base unit 1 in the area between the mount 2 and the mount 3. As becomes apparent from FIGS. 2 and 3, the bar 12 and hence the safety element 11 is aligned in its longitudinal dimension relative to the two drive spindles 7 and 8 and to the outer surface of the processing bowls 4, 6, in such a way that only one of the two processing bowls 4, 6 can be moved into its proper operating position while the other processing bowl is prevented by the safety element 11 from being inserted into its operating position.

Figure 4:
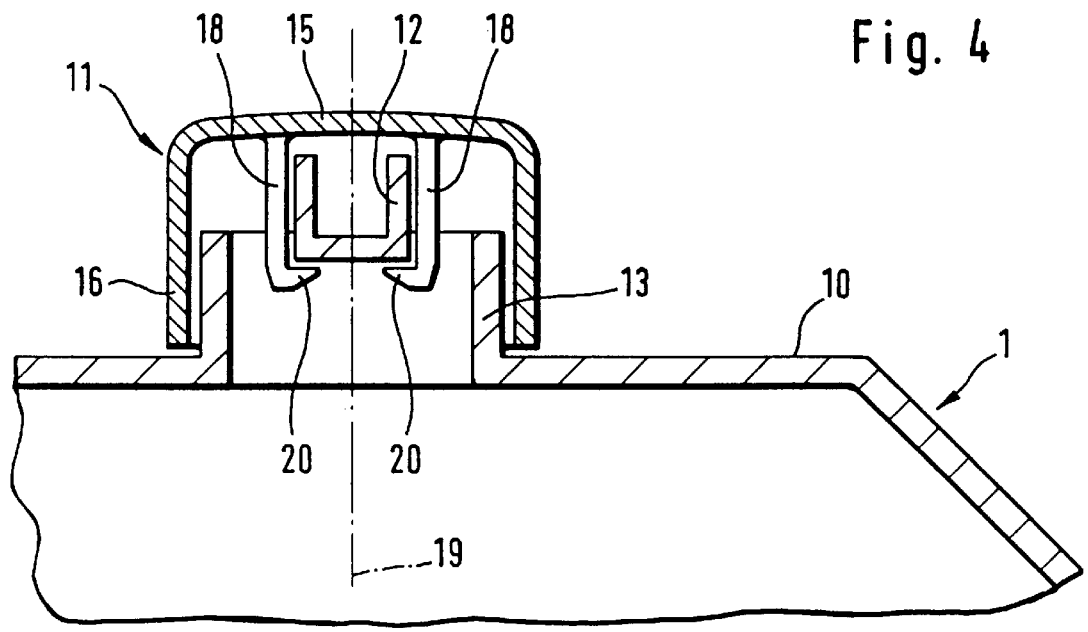
FIG. 4 is a partial sectional view of the food processing apparatus in the area of the safety element, taken along the line II—II of FIG. 3.
Figure 5:
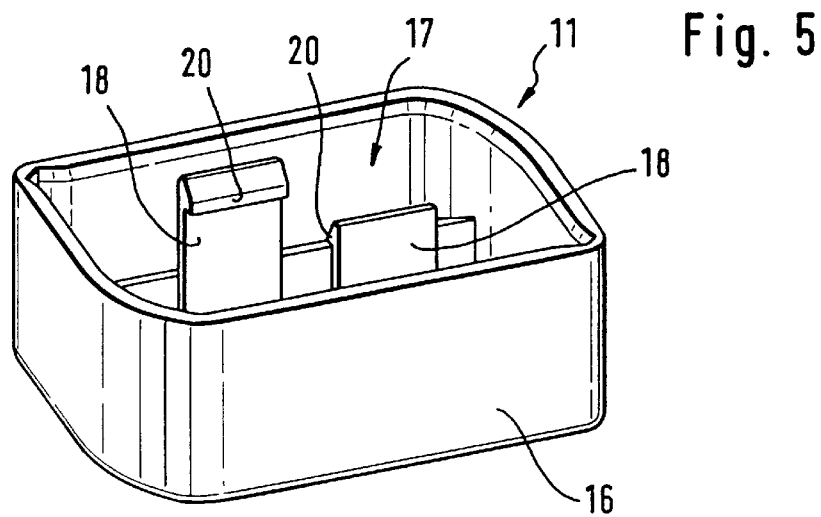
FIG. 5 is a perspective view of the underside of the safety element on an enlarged scale.

According to FIGS. 4 and 5, the safety element 11 has an upper cover 15 from which a circumferential flange 16 extends downwardly. In the inner space 17 bounded by the circumferential flange 16, two bars 18 equidistant from a center line 19 of the safety element 11 extend from the rear side of the upper cover 15. At the end of each of the bars 18 is a hook-type extension 20 projecting in the direction of the center line 19.

The safety element 11 is mounted on the bar 12 of the carrier 13 in such a way that the two bars 18 latch around the bar 12 with their hook-type extensions 20, thereby clampingly holding the safety element 11 on the bar 12. The longitudinal dimension of the bar is shorter than the inner space 17 of the safety element 11 in the direction of the center line 19 so that the safety element 11 can be displaced on the bar 12 in the direction of the double arrow 14 only as far as a left-hand or right-hand blocking position.

If the safety element 11 now occupies the right-hand blocking position, as is represented in FIGS. 2 and 3 by the continuous line, the left-hand processing bowl 4 can be placed in the left-hand mount 2 because the safety element 11 releases the cam face 22 formed on the processing bowl 4, enabling the processing bowl 4 to be turned and simultaneously lowered in the mount 2. The cam face 22, which extends radially outwardly, is provided for this purpose on the outer circumference of the bottom part of the processing bowl 4.

To lock the processing bowl 4 in its assigned mount 2, the processing bowl 4 is placed down on the mount 2 in the direction of the drive spindle 7 and is turned in the direction of the rotation arrow 23 in order to latch the corresponding holding and/or locking members 29 on the inside of the tubular skirt 28 of the processing bowl 4 in the corresponding holding and/or locking members 9 in the mount 2 so that the processing bowl 4 is firmly connected with the base unit 1. As this occurs, the drive spindle 7 couples with the drive shaft 31 of the processing bowl 4; because when the processing bowl 4 is turned in the direction of the arrow 23, the bowl 4 descends over the drive spindle 7, the holding and/or locking members 9, 29 acting as a kind of thread into which the processing bowl 4 is screw threaded and locked in position.

As the processing bowl is turned in the direction of the rotation arrow 23, the cam face 22 is turned towards the safety element 11 until the leading edge 32 of this cam face 22 abuts the outer side of the safety element 11, that is, the circumferential flange 16 (FIG. 4), urging the safety element into the right-hand position (FIG. 3).

Such a displacement of the safety element 11 into the position on the right is only possible, however, if the processing bowl 6 is not already inserted properly in operating position in the right-hand mount 3. If such a processing bowl 6 were inserted in the right-hand mount 3 which—unlike the left-hand mount of dome shape—is constructed as a recess in the base unit 1, the corresponding cam face 24 of the processing bowl 6 would abut the right-hand outer side of the safety element 11, to making it impossible for the safety element 11 to be moved or adjusted to the right in order to enable the left-hand processing bowl 4. Consequently, the processing bowl 4, which is to be positioned in the left-hand mount 2, cannot be turned any further because it has the leading edge 32 of its cam face in abutment with the safety element 11 and then cannot be turned any further, which is not shown however in the drawing. It is thus assured that only one processing bowl 4 can be placed at a time in operating position on the base unit 1 of a food processor equipped with two mounts 2, 3 as illustrated in the Figures.

The perspective representation of FIG. 1 shows an arrangement of processing bowls in which the left-hand processing bowl 4, which is assigned to the left mount 2, is firmly locked onto the base unit 1 while the right-hand processing bowl 6 is shown in a position in which it is not yet in driving connection with the drive spindle 8, as is also shown in FIG. 3. Since the left-hand processing bowl 4 is properly installed in the mount 2 and has therefore displaced, with its cam face 22, the safety element 11 into the blocking position on the right, the right-hand processing bowl 6 cannot be turned any further because the leading edge 33 of its cam face 24 would come up against the safety element. Hence the right-hand processing bowl 6 cannot be turned into the holding and/or locking members 9 and cannot descend, making it impossible for any driving connection to be established between the drive shaft 34 of the processing bowl 6 and the drive spindle 8 of the base unit 1.

As the embodiment of FIGS. 2, 3 and 4 shows, the safety element 11 is linearly slidably guided on the bar 12 in the direction of the double arrow 14. This represents a very simple and yet effective safety device which always prevents a further processing bowl 6 being moved into an operating position and hence into a driving connection with the other drive spindle 8 when a processing bowl 4 is already fitted to the appliance in a position ready for use.

Since the safety element 11 is arranged on the upper side 10 of the base unit 1 between the two mounts 2 and 3 where it can be seen easily by the user, the user can always tell that a second bowl 6 cannot be positioned as well in a driving connection with the drive spindle 8 when the processing bowl 4 is already fitted to the appliance, namely on account of the locking member 11 moved into its blocking position. The user will thus refrain from using force in an attempt to position the second processing bowl 6 on the appliance 1.

The invention claimed is:

We claim:

1. A food processing apparatus comprising:
   a base unit which has a first mount and a second mount, each for supporting a first processing bowl and second processing bowl, respectively;
   said base unit also including a locking device on each of the first and second mounts; and
   a safety element which is adjustable between at least two blocking positions in such a way that in one blocking position the first mount is rendered unable to accommodate said first bowl while the second mount is enabled to accommodate said second bowl, and that in a second blocking position the second mount is rendered unable to accommodate the second processing bowl while the first mount is enabled to accommodate the first processing bowl.

2. The food processing apparatus as claimed in claim 1, wherein the safety element is moved into its respective blocking position by either of the first and second processing bowls when either of said bowls is inserted in its mount.

3. The food processing apparatus as claimed in claim 1, wherein the safety element, when in its respective blocking position, projects into an area which the processing bowl to be blocked would normally occupy when in its operating position.

4. The food processing apparatus as claimed in claim 1, wherein each mount has a corresponding drive member and the safety element in the first and second blocking positions is positioned to be beneath the first and second processing bowls, respectively, when an attempt is made to insert that processing bowl in its mount in the direction of the axis of the drive member.

5. The food processing apparatus as claimed in claim 1, wherein the first and second bowls have locking members assigned to engage with corresponding locking devices on each of the first and second mounts and wherein the safety element in its first and second blocking positions extends into said locking members on the first and second processing bowls, respectively, preventing said locking members from engaging with each other.

6. The food processing apparatus as claimed in claim 2, wherein the safety element is moved into one of its first and second blocking positions for one of the first and second processing bowls when the other of the first and second processing bowls is inserted in its mount for use.

7. The food processing apparatus as claimed in claim 1, wherein the safety element is linearly adjustable between the first and second blocking positions.

8. The food processing apparatus as claimed in claim 7, wherein a bar is provided on which the safety element is slidably mounted.

9. The food processing apparatus as claimed in claim 1, wherein the safety element is adapted to rotate or pivot between the first and second blocking positions about an axis.

10. The food processing apparatus as claimed in claim 1, further comprising the first and second processing bowls each having a respective cam face which in an operating position moves the safety element into its corresponding blocking position.

11. The food processing apparatus as claimed in claim 10, wherein the cam face of each of the first and second bowls is arranged on the outer circumference of a bottom part of the corresponding processing bowl.

12. The food processing apparatus as claimed in claim 1, wherein the safety element is arranged on an upper side of the base unit.

13. The food processing apparatus as claimed in claim 1, further comprising stops which limit the length of displacement of the safety element.

14. A food processing apparatus comprising:
a first processing bowl having a locking device;
a second processing bowl having a locking device; and
a base unit which has a first mount supporting the first processing bowl and a second mount supporting the second processing bowl, said base unit further including:
a locking device on the first mount which cooperates with the locking device on the first bowl and a locking device on the second mount which cooperates with the locking device on the second bowl;
a safety element which is adjustable between a first blocking position and a second blocking position, wherein when the safety element is in its first blocking position, the first mount is rendered unable to accommodate the first bowl while the second mount is enabled to accommodate the second bowl, and when the safety element is in its second blocking position, the second mount is rendered unable to accommodate the second processing bowl while the first mount is enabled to accommodate the first processing bowl.

\* \* \* \* \*